(12) United States Patent
Lee et al.

(10) Patent No.: US 10,178,547 B2
(45) Date of Patent: Jan. 8, 2019

(54) METHOD AND DEVICE FOR OBTAINING SYSTEM INFORMATION IN WIRELESS COMMUNICATION SYSTEM

(71) Applicant: LG ELECTRONICS INC., Seoul (KR)

(72) Inventors: Jaewook Lee, Seoul (KR); Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/541,005

(22) PCT Filed: Dec. 23, 2015

(86) PCT No.: PCT/KR2015/014181
§ 371 (c)(1),
(2) Date: Jun. 29, 2017

(87) PCT Pub. No.: WO2016/108503
PCT Pub. Date: Jul. 7, 2016

(65) Prior Publication Data
US 2018/0007543 A1    Jan. 4, 2018

Related U.S. Application Data

(60) Provisional application No. 62/097,590, filed on Dec. 30, 2014.

(51) Int. Cl.
*H04W 4/70* (2018.01)
*H04L 5/00* (2006.01)
(Continued)

(52) U.S. Cl.
CPC .............. *H04W 8/22* (2013.01); *H04L 5/00* (2013.01); *H04W 4/70* (2018.02); *H04W 8/005* (2013.01);
(Continued)

(58) Field of Classification Search
CPC ....... H04W 4/70; H04W 72/042; H04W 8/22; H04W 48/16; H04W 72/0413;
(Continued)

(56) References Cited

U.S. PATENT DOCUMENTS

2013/0250878 A1*  9/2013  Sayana ................. H04W 48/12
                                                                         370/329
2015/0181575 A1*  6/2015  Ng ....................... H04L 5/0092
                                                                         370/329

FOREIGN PATENT DOCUMENTS

WO    2013/043006 A1    3/2013
WO    2013/055193 A2    4/2013
WO    2013/141657 A1    9/2013

OTHER PUBLICATIONS

LG Electronics, "Cell Acquisition and Reference Signals for Coverage Limiting MTC UEs", 3GPP TSG RAN WG1#72 R1-130263, Agenda Item 7.3.4, Jan. 2013, 9 pages.
(Continued)

*Primary Examiner* — Nam T Nguyen
(74) *Attorney, Agent, or Firm* — Lee, Hong, Degerman, Kang & Waimey

(57) ABSTRACT

Provided are a method for receiving/decoding a system information block by a terminal and a device for supporting same. The terminal can receive one or more MIBs and receive/decode a first SIB on the basis of the received MIBs and a first time offset. The first SIB is an SIB which has been newly defined for a terminal having low complexity.

14 Claims, 16 Drawing Sheets

(51) Int. Cl.
    *H04W 8/00*           (2009.01)
    *H04W 8/22*           (2009.01)
    *H04W 48/16*         (2009.01)
    *H04W 72/04*         (2009.01)
    *H04W 76/14*         (2018.01)
    *H04W 84/18*         (2009.01)

(52) U.S. Cl.
    CPC ....... *H04W 48/16* (2013.01); *H04W 72/0413* (2013.01); *H04W 72/0446* (2013.01); *H04W 76/14* (2018.02); *H04W 84/18* (2013.01)

(58) Field of Classification Search
    CPC . H04W 8/005; H04W 72/0446; H04W 76/14; H04W 84/18; H04L 5/00
    See application file for complete search history.

(56) References Cited

OTHER PUBLICATIONS

Alcatel-Lucent, Alcatel-Lucent Shanghai Bell, "Coverage Enhancement for (E)PDCCH", 3GPP TSG-RAN WG1 Meeting #76, R1-140154, Agenda Item 7.2.2.3, Feb. 2014, 7 pages.
PCT International Application No. PCT/KR2015/014181 International Search Report dated Mar. 31, 2016, 4 pages.

\* cited by examiner

METHOD AND DEVICE FOR OBTAINING SYSTEM INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2015/014181, filed on Dec. 23, 2015, which claims the benefit of U.S. Provisional application Ser. No. 62/097,590 filed on Dec. 30, 2014, the contents of which are all hereby incorporated by reference herein in their entirety.

BACKGROUND OF THE INVENTION

Field of the Invention

The present invention relates to a wireless communication system, and more particularly, to a method for scheduling system information by a network in a wireless communication system, a method for obtaining system information by a user equipment (UE) in a coverage-enhanced area, and a device supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

In recent years, machine-to-machine/Internet of Things (M2M/IoT), which connects all every objects through networks to facilitate obtaining and transmitting necessary information anytime and anywhere, thereby making it possible to offer and use various services, has become a major issue for a next-generation communication market.

While early M2M started with a sensor and an RFID network mainly for local areas, various wired/wireless networks may be used with gradually diversifying purposes and characteristics of applications. Recently, M2M based on a mobile communication network receives growing attention in view of the mobility of objects, a wide range of service areas including not only islands and mountains but also the sea, ease of network management and maintenance, security for reliable data transmission, and guarantee of service quality. Accordingly, with studies on the feasibility of M2M started in 2005, the 3GPP has been conducting a full-scale standardization project under the name "Machine Type Communications (MTC)" since 2008.

The 3GPP regards a machine as an entity that does not require direct human manipulation or intervention and defines MTC as a form of data communication involving one or more of machines. Typical examples of the machine include a smart meter and a vending machine that are equipped with a mobile communication module. Recently, with the introduction of a smart phone that performs communication by automatically connecting to a network, without any user operation or intervention, depending on a user's location or conditions, a mobile terminal having an MTC function is considered as a form of a machine. Also, a gateway-type MTC device connected to an IEEE 802.15 WPAN-based subminiature sensor or RFID is also considered.

SUMMARY OF THE INVENTION

The present invention provides a method for a coverage-enhancement user equipment (UE) to obtain system information and a device supporting the same. A newly defined system information block (SIB) may be decoded in a resource region spaced by a time offset away from a received master information block (MIB). In addition, a PDCCH for a newly defined SIB may be decoded in a resource region spaced by an offset from the received MIB, and the newly defined SIB may be decoded using the decoded PDCCH. Furthermore, there may be one or more newly defined SIBs.

One embodiment provides a method for receiving, by a UE, a system information block (SIB) in a wireless communication system. The UE may receive one master information block (MIB) or more; and may receive a first SIB based on the received MIB and a first time offset, wherein the first SIB may be an SIB that is newly defined for a low-complexity UE.

The first time offset may be predefined or may be indicated by the received MIB.

The received MIB may be a last received MIB among the one MIB or more.

The low-complexity UE may be one of a machine-type communication (MTC) UE, a low-cost UE, a UE Category 0 UE, a narrow band-Internet of Things (IoT) UE, and a coverage-enhancement UE.

The first SIB may be received in a resource region indicated by a physical downlink control channel (PDCCH) for the first SIB, the PDCCH for the first SIB may be received in a resource region spaced by the first time offset away from a start time of the received MIB, and the PDCCH for the first SIB may include information on a frequency region and a time region for the first SIB.

The first SIB may be received in a resource region indicated by a PDCCH for the first SIB, the PDCCH for the first SIB may be received in a resource region spaced by the first time offset away from an end time of the received MIB, and the PDCCH for the first SIB may include information on a frequency region and a time region for the first SIB.

The PDCCH for the first SIB may further include modulating and coding information on the first SIB.

The first SIB may be received in a resource region spaced by the first time offset away from a start or end time of the received MIB.

The first SIB may be received using information obtained by decoding a PDCCH related to the first SIB in a resource region spaced by the first time offset away from a start or end time of the received MIB.

The method may further include receiving a second SIB based on the received first SIB, the second SIB may be an SIB that is newly defined for the low-complexity UE, and the first SIB may include information on a frequency region and a time region for the second SIB.

The method may further include receiving a second SIB based on the received MIB and a second time offset, and the second SIB may be an SIB that is newly defined for the low-complexity UE.

The second SIB may be received in a resource region spaced by the second time offset away from a start or end time of the received MIB.

the second SIB may be received in a resource region indicated by a PDCCH for the second SIB, the PDCCH for the second SIB may be received in a resource region spaced by the second time offset away from a start or end time of the received MIB, and the PDCCH for the second SIB may include information on a frequency region and a time region for the second SIB.

Another embodiment provides a method for scheduling, by a network, an SIB in a wireless communication system. The method may include: scheduling one MIB or more; and scheduling a first SIB based on the scheduled MIB and a first time offset, wherein the first SIB may be an SIB that is newly defined for a low-complexity UE.

Still another embodiment provides a device for receiving an SIB in a wireless communication system. The device may include: a memory; a transceiver; and a processor to connect the memory and the transceiver, wherein the processor may control the transceiver to receive one MIB or more and may control the transceiver to receive a first SIB based on the received MIB and a first time offset, and the first SIB may be an SIB that is newly defined for a low-complexity UE.

A coverage-enhanced UE is capable of successfully receiving newly defined system information.

DESCRIPTION OF EXEMPLARY
EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
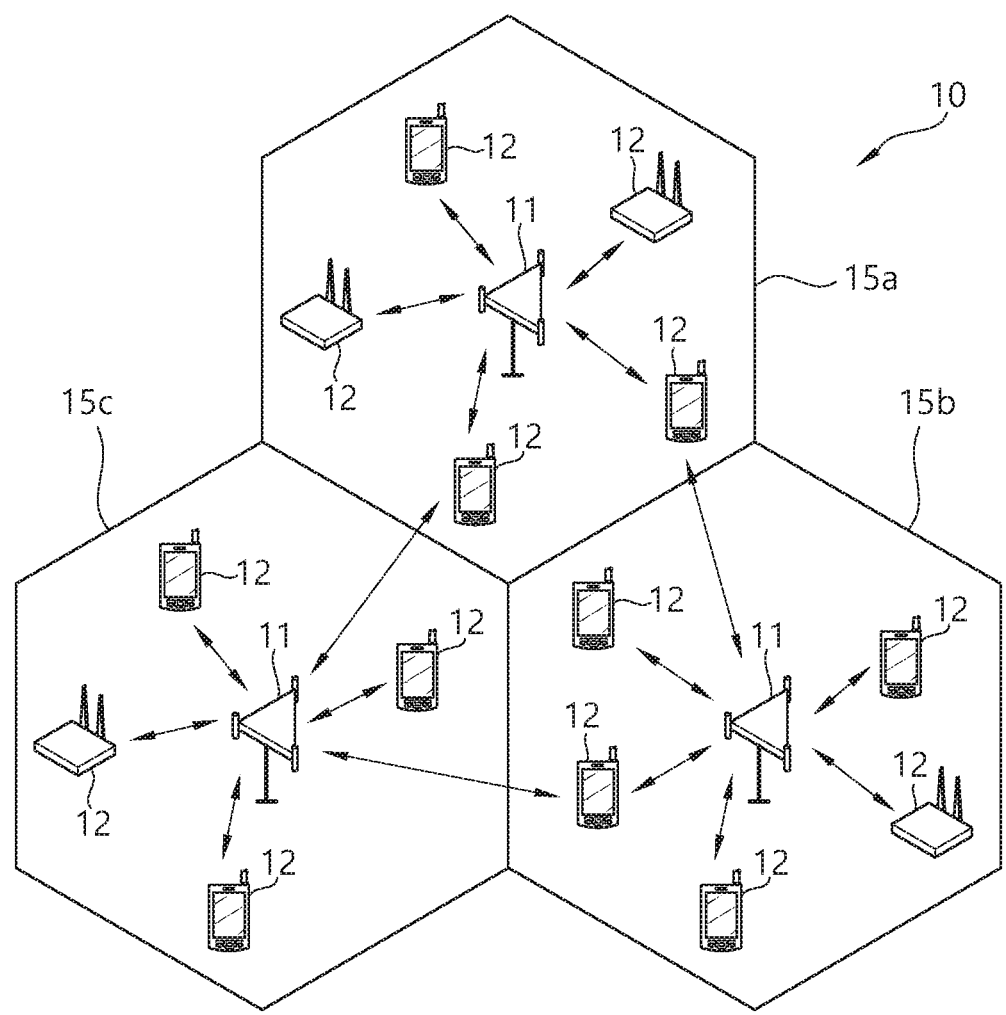
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
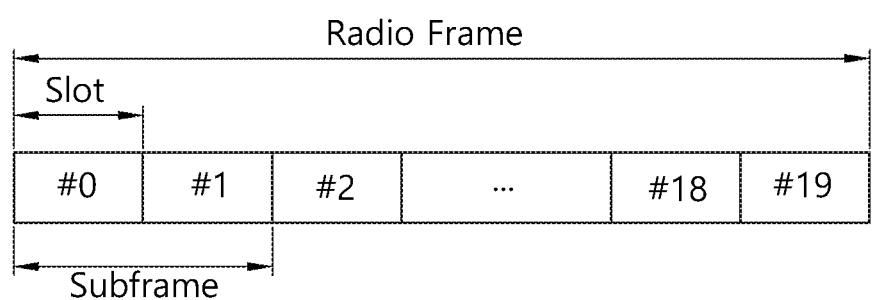
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
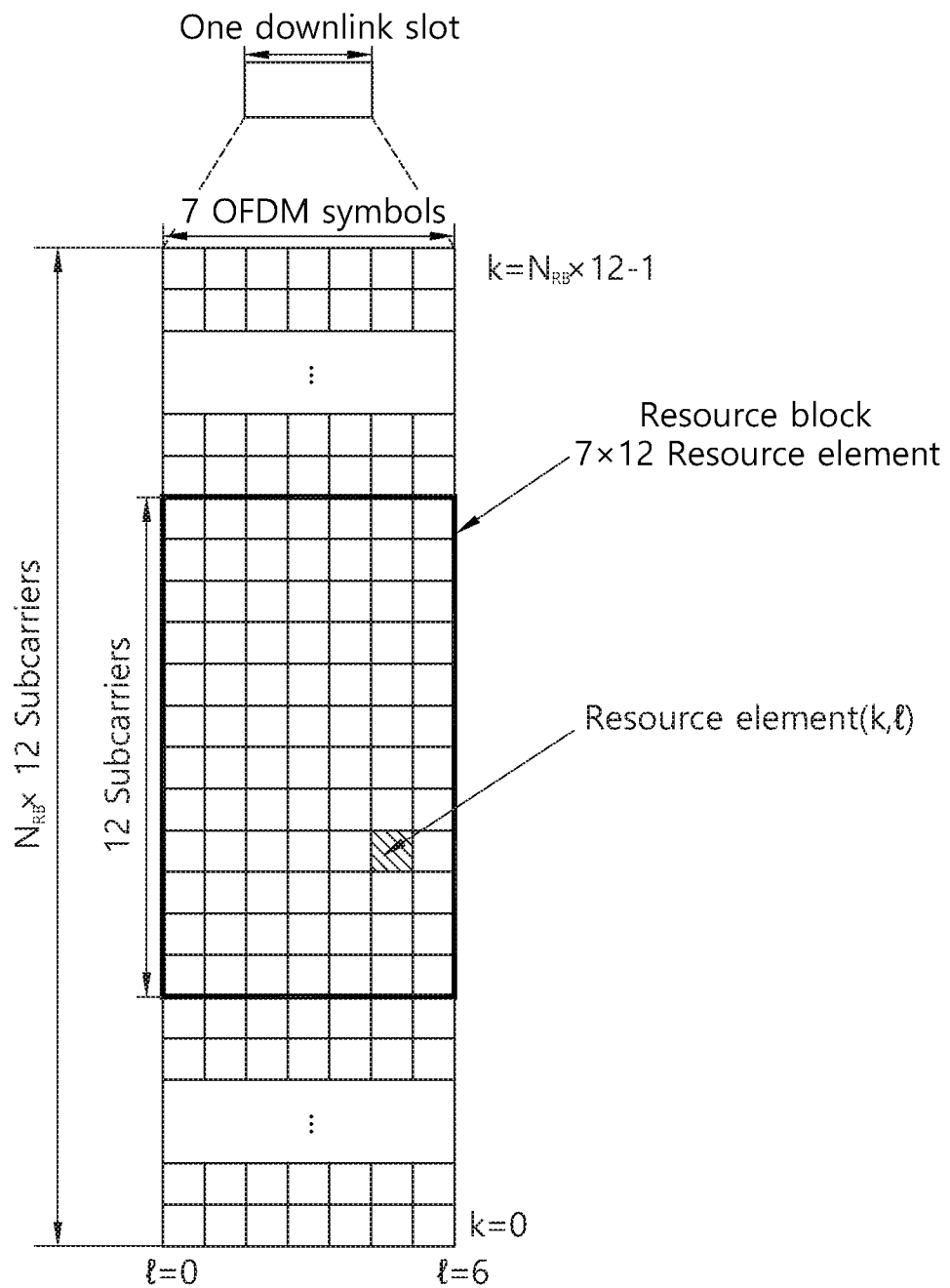
FIG. 3 shows an example of a resource grid of a single downlink slot.

FIG. 3 shows an example of a resource grid of a single downlink slot.

A downlink slot includes a plurality of OFDM symbols in the time domain and NRB number of resource blocks (RBs) in the frequency domain. The NRB number of resource blocks included in the downlink slot is dependent upon a downlink transmission bandwidth set in a cell. For example, in an LTE system, NRB may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,1) in the slot. Here, k (k=0, . . . , NRB×12−1) is a subcarrier index in the frequency domain, and 1 is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
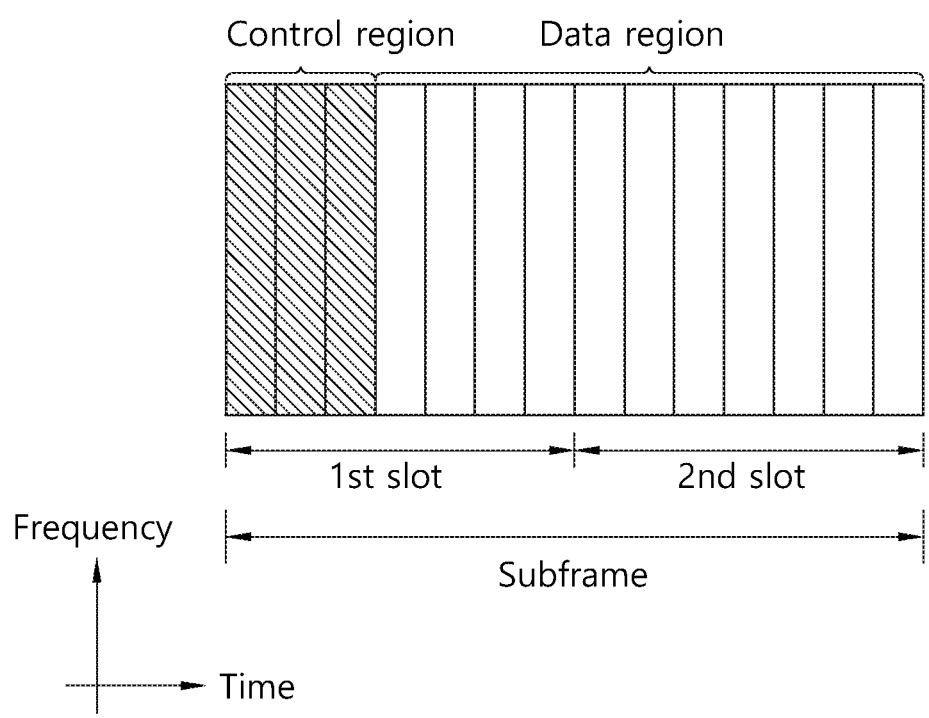
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
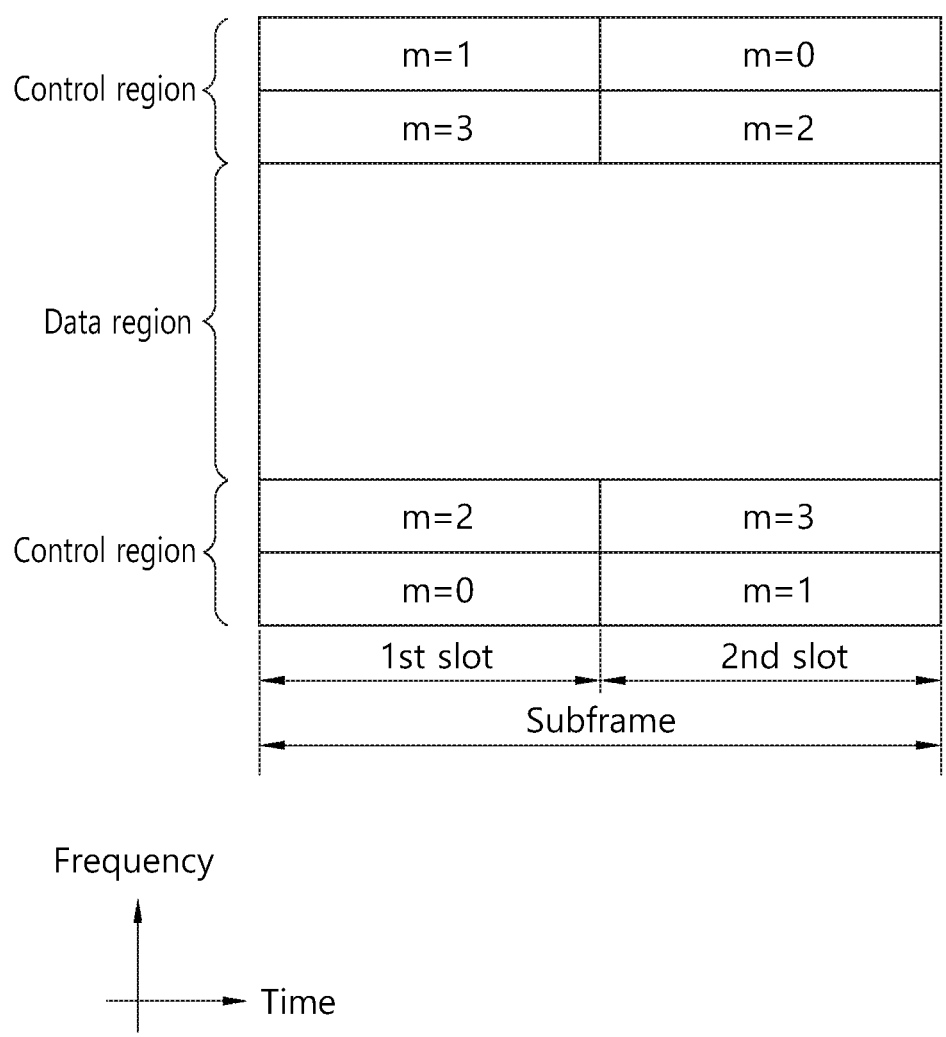
FIG. 5 shows the structure of an uplink subframe.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. If indicated by a higher layer, the user equipment may support simultaneous transmission of the PUCCH and the PUSCH.

The PUCCH for one UE is allocated in an RB pair. RBs belonging to the RB pair occupy different subcarriers in each of a 1st slot and a 2nd slot. A frequency occupied by the RBs belonging to the RB pair allocated to the PUCCH changes at a slot boundary. This is called that the RB pair allocated to the PUCCH is frequency-hopped at a slot boundary. Since the UE transmits UL control information over time through different subcarriers, a frequency diversity gain can be obtained. In the figure, m is a location index indicating a logical frequency-domain location of the RB pair allocated to the PUCCH in the subframe.

Uplink control information transmitted on the PUCCH may include a HARQ ACK/NACK, a channel quality indicator (CQI) indicating the state of a downlink channel, a scheduling request (SR) which is an uplink radio resource allocation request, and the like.

The PUSCH is mapped to a uplink shared channel (UL-SCH), a transport channel Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

Figure 6:
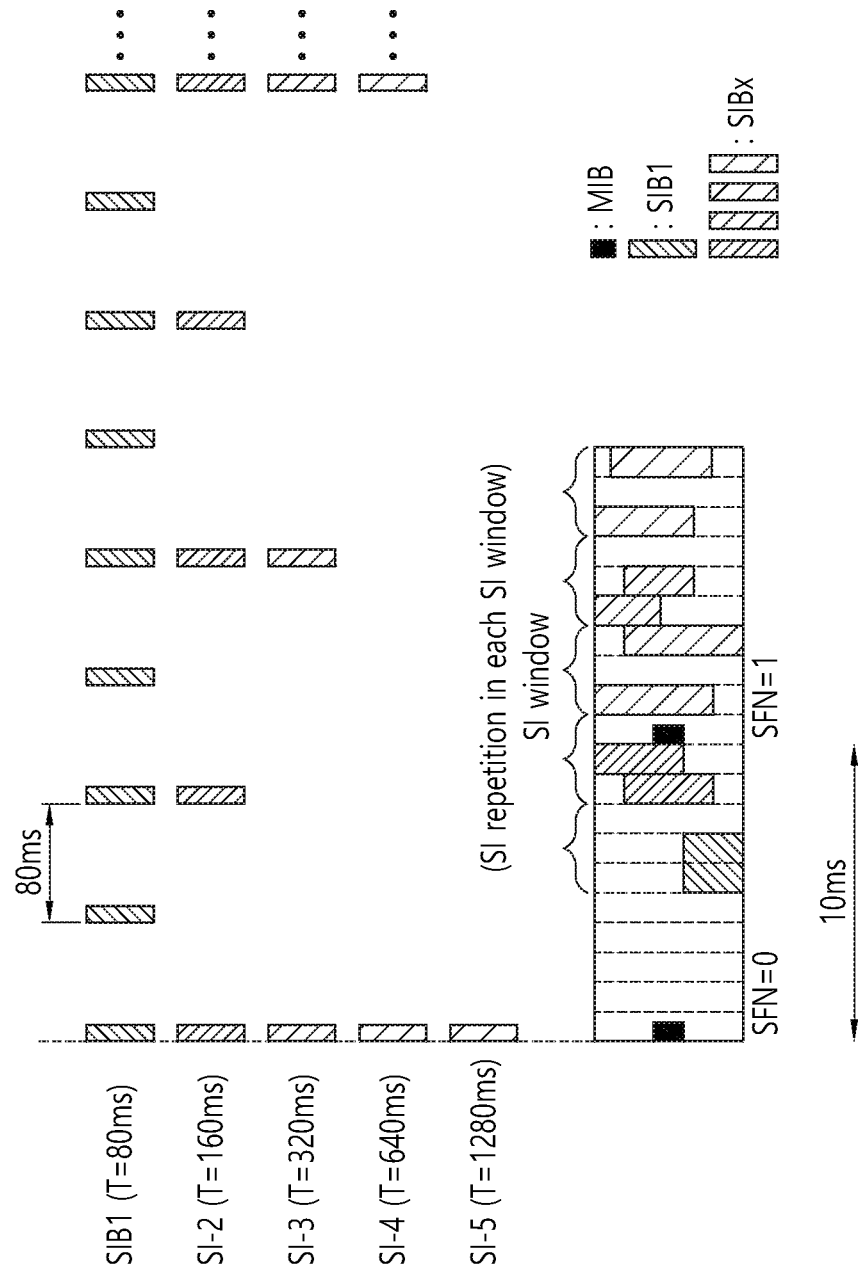
FIG. 6 illustrates an example of transmitting a master information block (MIB), system information block1 (SIB1), and other SIBs.

FIG. 6 illustrates an example of transmitting a master information block (MIB), system information block1 (SIB1), and other SIBs.

An LTE cell broadcasts basic parameters necessary for the operation of an IDLE_MODE UE and a CONNECTED_MODE UE via a plurality of separate information blocks. Examples of information blocks include an MIB, SIB1, SIB2, and other SIBs (SIBn).

The MIB includes the most essential parameters needed for a UE to access a cell. Referring to FIG. 6, an MIB message is broadcast through a BCH according to a periodicity of 40 ms, and MIB transmission is repeated in all radio frames within the periodicity of 40 ms. The UE receives an SIB message using the parameters received via the MIB.

There are different types of SIBs.

SIB1 includes pieces of information associated with cell access, and particularly includes scheduling information on other SIBs (SIB2 to SIBn) than SIB1. SIBs having the same transmission periodicity among the SIBs other than SIB1are transferred via the same system information (SI) message. Thus, scheduling information includes a mapping relationship between each SIB and an SI message. An SI message is transmitted within an SI window in a time domain, and each SI message is associated with one SI window. Since SI windows for different pieces of SI do not overlap, only one SI message is transmitted within an SI window. Thus, scheduling information includes the duration of an SI window and an SI transmission periodicity. Time/frequency for transmitting an SI message is determined by dynamic scheduling by a BS. SIB1is broadcast through a downlink shared channel (DL SCH) according to a periodicity of eight radio frames (that is, 80-ms periodicity), and SIB1is repeatedly retransmitted on a fifth subframe of an SFN-mod-2 radio frame within the 80-ms periodicity.

SIB2 includes necessary information for a UE to access a cell. SIB2 includes information on an uplink cell bandwidth, a random access parameter, and an uplink power control parameter.

SIB3 includes cell reselection information. SIB4 includes frequency information on a serving cell and intra-frequency information on a neighboring cell for cell reselection. SIB5 includes frequency information on a different E-UTRA and inter-frequency information on a neighboring cell for cell reselection. SIB6 includes frequency information on a UTRA and information on a UTRA neighboring cell for cell reselection. SIB7 includes frequency information on a GERAN for cell reselection. SIB8 includes information on a neighboring cell.

SIB9 includes a Home eNodeB (HeNB) identifier (ID). SIB10 to SIB12 include a public warning message, for example, for earthquake warning. SIB14 is used to support enhanced access barring and controls UEs to access a cell. SIB15 includes information needed to receive an MBMS at contiguous carrier frequencies. SIB16 include GPS time and coordinated universal time (UTC)-related information. SIB17 includes RAN auxiliary information.

Not all SIBs are always required to be present. For example, SIB9 is not needed in a mode where a wireless carrier establishes an HeNB, while SIB13 is not needed if a cell provides no MBMS.

System information is commonly applied to all UEs accessing a cell, and UEs need to always maintain up-to-date system information to perform an appropriate operation. When system information is changed, UEs need to know in advance the time the BS transmits new system information. In order that a BS and a UE mutually recognize a radio frame period for transmitting new system information, the concept of BCCH modification period is introduced in "3GPP TS 36.331 v9. 3.0," which is described in detail.

Figure 7:
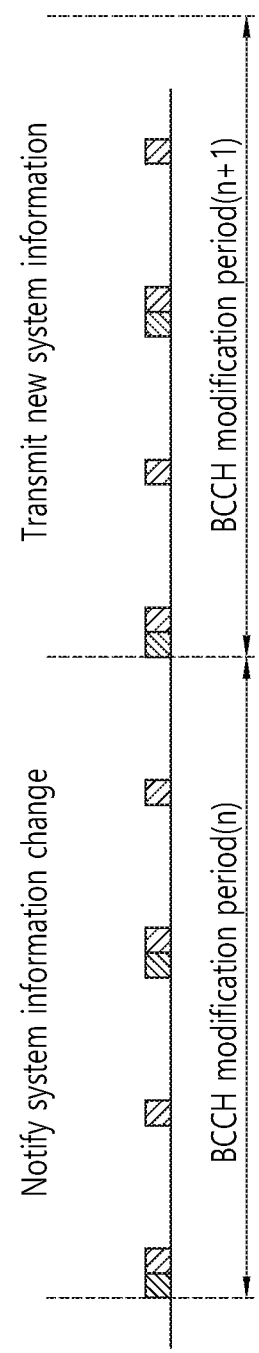
FIG. 7 illustrates an update of system information.

FIG. 7 illustrates an update of system information.

Referring to FIG. 7, a BS, which intends to update system information in an (n+1)th modification period, notifies in advance UEs of an update of system information in an nth modification period. A UE, which is notified the update of the system information in the nth modification period, receives and applies new system information at the very beginning of the (n+1)th modification period. When an update of system information is scheduled, the BS includes a system information modification indicator in a paging message. Generally, a paging message is a message received by an idle-mode UE. However, since an update of system information is notified through a paging message, a connected-mode UE also needs to receive a paging message at times and to identify an update of system information.

Hereinafter, machine-type communication (MTC) will be described.

Figure 8:
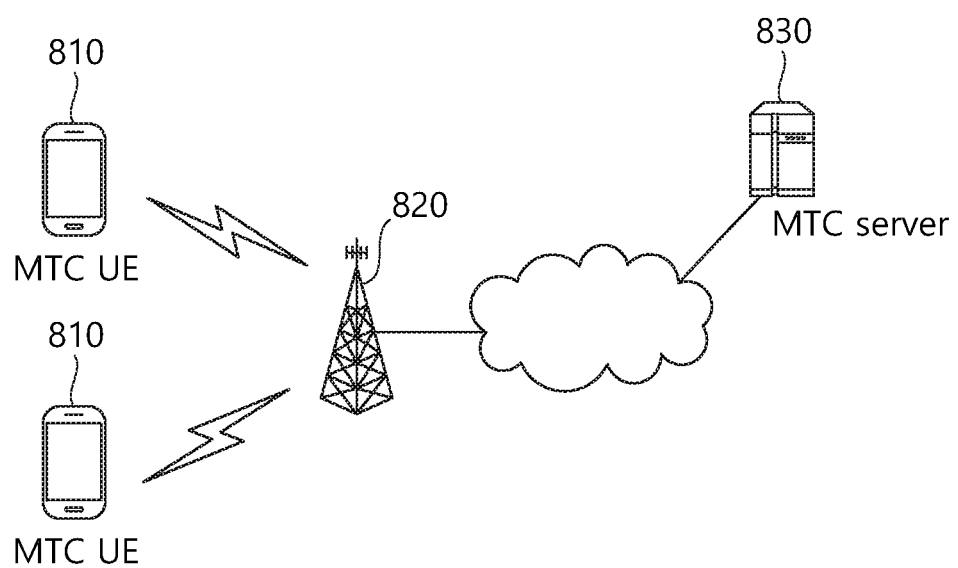
FIG. 8 illustrates an example of MTC.

FIG. 8 illustrates an example of MTC.

MTC refers to information exchange between MTC UEs 810 via a BS 820 without involving human interactions or information exchanges between an MTC UE 810 and an MTC server 830 via the BS. Services provided through MTC are differentiated from existing communication services requiring human intervention, and MTC provides a wide range of services, such as tracking, metering, payment, medical services, remote control, and the like. More specifically, services provided through MTC may include reading a meter, measuring a water level, utilizing a surveillance camera, reporting the inventory of a vending machine, and the like. Data communication-oriented low-cost/low-specification UEs that provide these services are referred to as an MTC UE or low complexity-type UE for convenience. A BS may determine whether a UE is an MTC UE based on the capability of the UE. In the present specification, an MTC UE, a low-complexity UE, a low-cost UE, a UE Category 0 UE, an NB-IoT UE, and a coverage-enhancement UE may be used with the same meaning, and a normal UE may be used to refer to a UE other than the listed UEs.

The MTC server 830 is an entity communicating with the MTC UE 810. The MTC server 830 runs an MTC application and provides an MTC-specific service to an MTC device. The MTC UE 810 is a wireless device that provides MTC communication and may be fixed or mobile.

Since an MTC UE has a small amount of data to transmit and is occasionally involved in uplink/downlink data transmission/reception, it is effective to reduce the cost of the UE and to decrease battery consumption thereof according to a low data transmission rate. The MTC UE is characterized by low mobility and thus has a hardly changing channel environment.

The MTC UE does not require a high-performance function and generally uses a small amount of data. The concept of UE Category 0 is introduced in order to manufacture a low-cost MTC UE. A UE category is a general number used in the 3GPP to indicate how much data a UE can process in a communication modem. Table 3 shows 3GPP UE categories.

TABLE 3

| UE Category | DL speed | UL speed |
|---|---|---|
| 0 | 1 Mbps | 1 Mbps |
| 1 | 10 Mbps | 5 Mbps |
| 2 | 50 Mbps | 25 Mbps |
| 3 | 100 Mbps | 50 Mbps |
| 4 | 150 Mbps | 50 Mbps |
| 5 | 300 Mbps | 75 Mbps |
| 6 | 300 Mbps | 50 Mbps |
| 7 | 300 Mbps | 100 Mbps |
| 8 | 3 Gbps | 1.5 Gbps |
| 9 | 450 Mbps | 50 Mbps |
| 10 | 450 Mbps | 100 Mbps |
| 11 | 600 Mbps | 50 Mbps |
| 12 | 600 Mbps | 100 Mbps |
| 13 | 400 Mbps | 50 Mbps |

A UE Category 0 UE is allowed to process only 1 Mbps, making it possible to manufacture a modem without much effort and high costs, and may use only one antenna. Also, the UE Category 0 UE is allowed to perform transmission or reception only in a specified time, rather than simultaneously performing transmission and reception, and thus may operate in FDD in the same manner as in TDD. In addition, unlike in existing TDD, a sufficient switching time of about 1 ms may be assigned for a period of transition between transmission and reception, thereby remarkably reducing costs for hardware components, particularly in view of a modem and RF, overall.

MTC UEs may be installed not only in buildings and factories but also in coverage-limited places, for example, a basement. For instance, about 20% of MTC UEs supporting an MTC service, such as smart metering, may be installed in a poor 'deep indoor' environment, such as a basement. Thus, for successful MTC data transmission, it is necessary to increase the coverage of an MTC UE by about 20 dB as compared with the coverage of a conventional normal UE. Considering this situation, various coverage enhancement techniques are currently under discussion, such as a repetitive transmission method for an MTC UE by each channel/signal.

Figure 9:
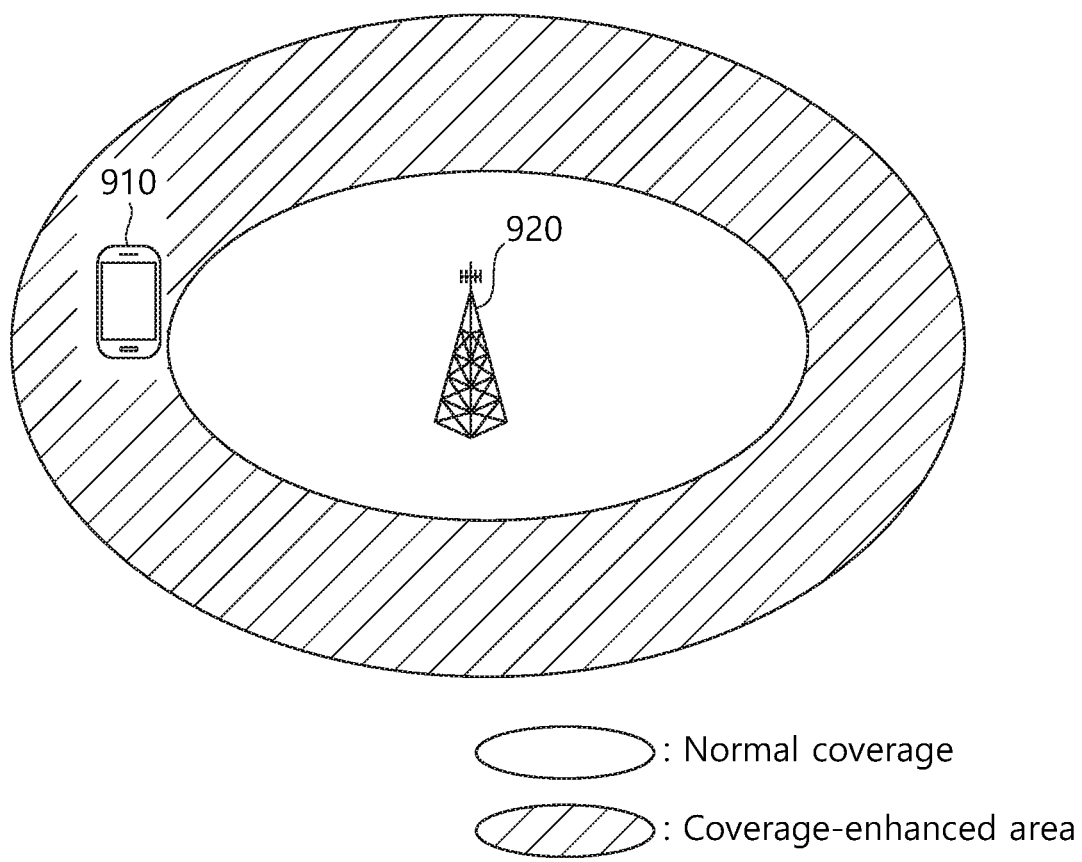
FIG. 9 illustrates an example of cell coverage enhancment for an MTC device.

FIG. 9 illustrates an example of cell coverage enhancment for an MTC device.

As described above, various coverage enhancement techniques, such as a repetitive transmission method for an MTC UE by each channel/signal, have recently been under discussion. However, if a BS transmits an MIB and an SIB in the same manner as to a normal UE, an MTC UE 910 located in a coverage-enhanced area as illustrated in FIG. 9 has difficulty in receiving the MIB and the SIB.

Thus, in order that an MTC UE located in an area requiring a coverage enhancement method successfully receives system information, new system information may be defined, and the new system information may be repetitively transmitted in a time domain.

If a newly defined system information block (SIB) is neither scheduled by SIB1nor uses a fixed schedule unlike SIB1, the UE may need to know where the newly defined SIB is scheduled. However, adding much information to an MIB to schedule the newly defined SIB needs a greater number of repetitions, causing overheads for network resources. Thus, the present invention proposes a method for scheduling a newly defined SIB without causing overheads for network resources. Further, the present invention proposes a method for a UE to decode a newly defined SIB which is scheduled. In the present invention, an SIB a system information block newly defined for a low-complexity UE, a coverage-enhancement UE, and/or a low-complexity UE using coverage enhancement.

Hereinafter, methods for scheduling and decoding an SIB proposed in the present invention are described. In FIGS. 10 to 13 below, the same message in each box may be repeated once or more times.

Figure 10:
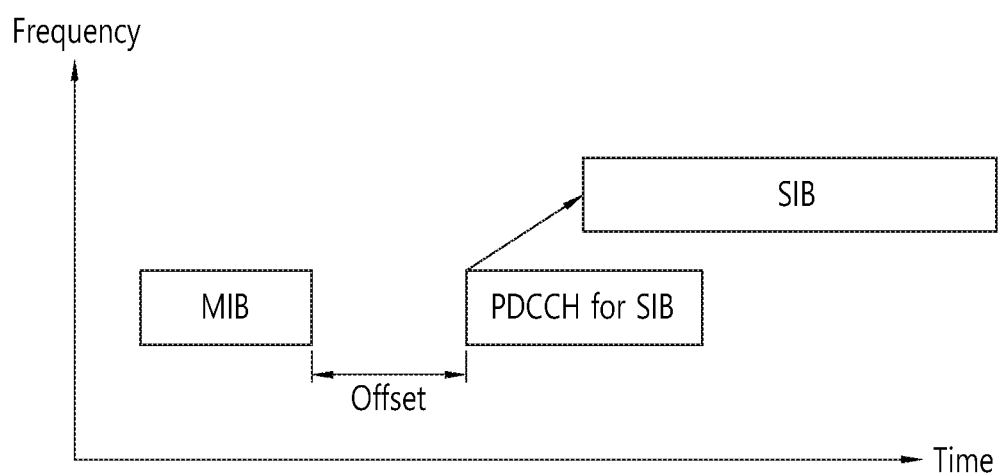
FIG. 10 illustrates an example of a method for scheduling and decoding an SIB according to an embodiment of the present invention.

FIG. 10 illustrates an example of a method for scheduling and decoding an SIB according to an embodiment of the present invention.

An SIB scheduling method is described first. A PDCCH for an SIB may be scheduled using a time offset related to an MIB repetition period. That is, the PDCCH may be scheduled in a resource region spaced by the offset away from the start of the MIB repetition period or may be scheduled in a resource region spaced by the offset away from the end of the MIB repetition period. The PDCCH for the SIB may be positioned in the same frequency region as for an MIB or may be fixed in a specified frequency region. The PDCCH for the SIB may indicate modulation/coding information for decoding the SIB and frequency/time region information on the SIB.

Next, a method for a UE to decode the SIB is described. After receiving the MIB, the UE may attempt to decode the PDCCH for the SIB at end time of last MIB repetition subframe+ offset. Alternatively, the UE may attempt to decode the PDCCH for the SIB at start time of last MIB repetition subframe+ offset. After successfully decoding the PDCCH, the UE may attempt to read the SIB in a resource region indicated by the PDCCH.

Figure 11:
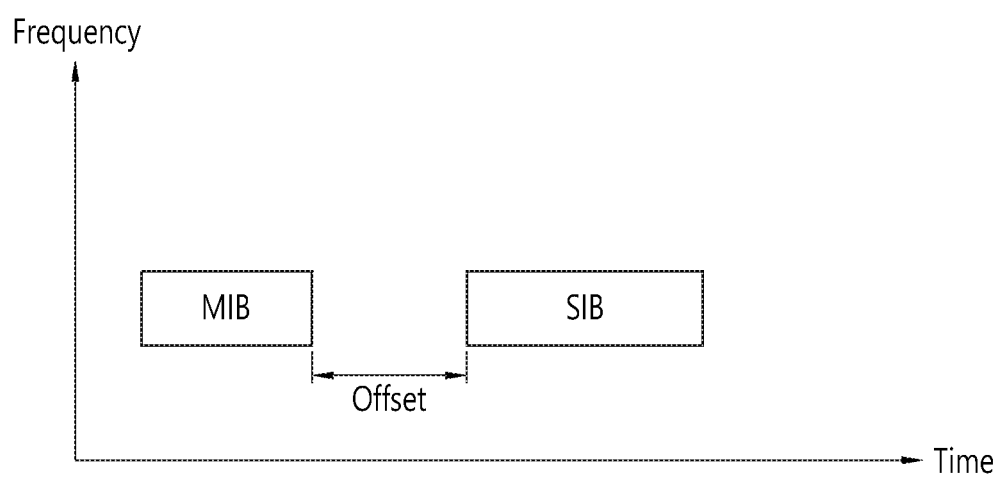
FIG. 11 illustrates another example of a method for scheduling and decoding an SIB according to an embodiment of the present invention.

FIG. 11 illustrates another example of a method for scheduling and decoding an SIB according to an embodiment of the present invention.

An SIB scheduling method is described first. An SIB may be scheduled using a time offset related to an MIB repetition period. That is, the SIB may be scheduled in a resource region spaced by the offset away from the start of the MIB repetition period or may be scheduled in a resource region spaced by the offset away from the end of the MIB repetition period. Alternatively, the SIB may be scheduled in a resource region spaced by the offset from the position of each MIB. Here, a UE may know the MIB repetition period and the positions of the repeated MIBs. When the SIB is repeated a plurality of times between the MIB and the subsequent MIB, information on the number of SIB repetitions may be fixed or may be transmitted to the MIB. The SIB may be positioned in the same frequency region as for the MIB or may be fixed in a frequency region.

Next, a method for a UE to decode the SIB is described. After receiving the MIB, the UE may immediately attempt to receive/decode the SIB at end time of last MIB repetition subframe+ offset, without reading a PDCCH. Alternatively, the UE may immediately attempt to receive/decode the SIB at start time of last MIB repetition subframe+ offset, without reading a PDCCH. The UE may immediately attempt to receive/decode the SIB at start/end time of each MIB repetition subframe+ offset, without reading a PDCCH.

A relevant PDCCH for reception/decoding of the SIB may be used, instead of immediately attempting to receive/decode the SIB. Specifically, to receive/decode the SIB, the UE may attempt to monitor/decode the relevant PDCCH using an SI-RNTI in the resource region spaced by the offset away from the start of the MIB repetition period or in the resource region spaced by the offset away from the end of the MIB repetition period. Alternatively, the UE may attempt to monitor/decode the PDCCH at start/end time of each MIB repetition subframe+ offset.

Figure 12:
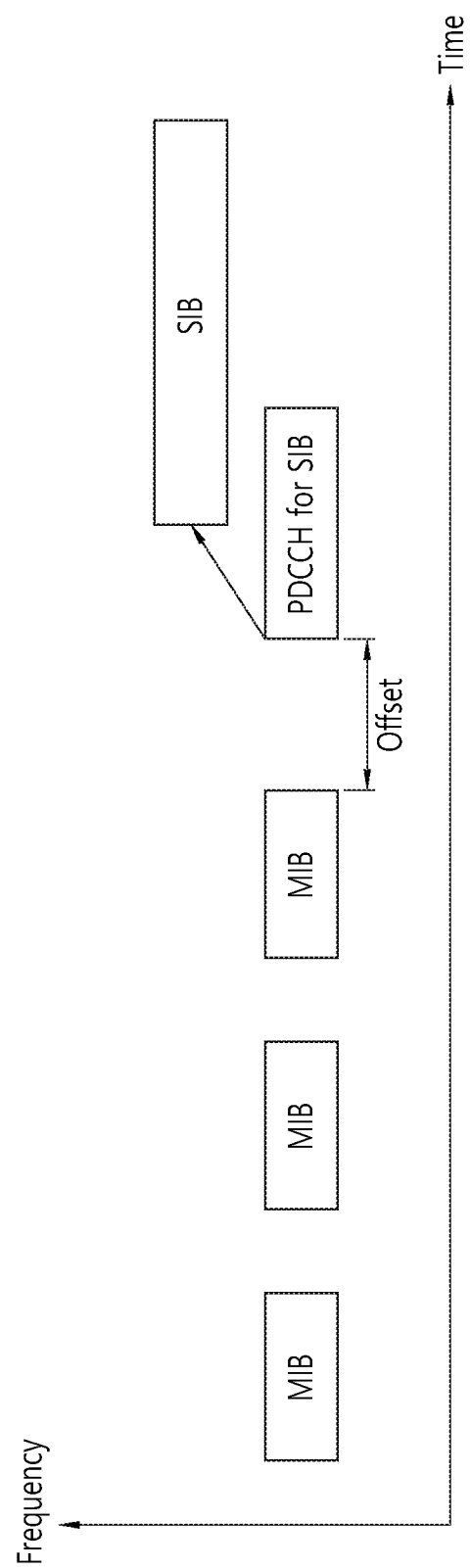
FIG. 12 illustrates still another example of a method for scheduling and decoding an SIB according to an embodiment of the present invention.

FIG. 12 illustrates still another example of a method for scheduling and decoding an SIB according to an embodiment of the present invention.

Referring to FIG. 12, an SIB repetition may occur after a plurality of MIB repetition periods. Methods for scheduling and decoding an SIB are the same as those described in FIGS. 10 and 11.

Figure 13:
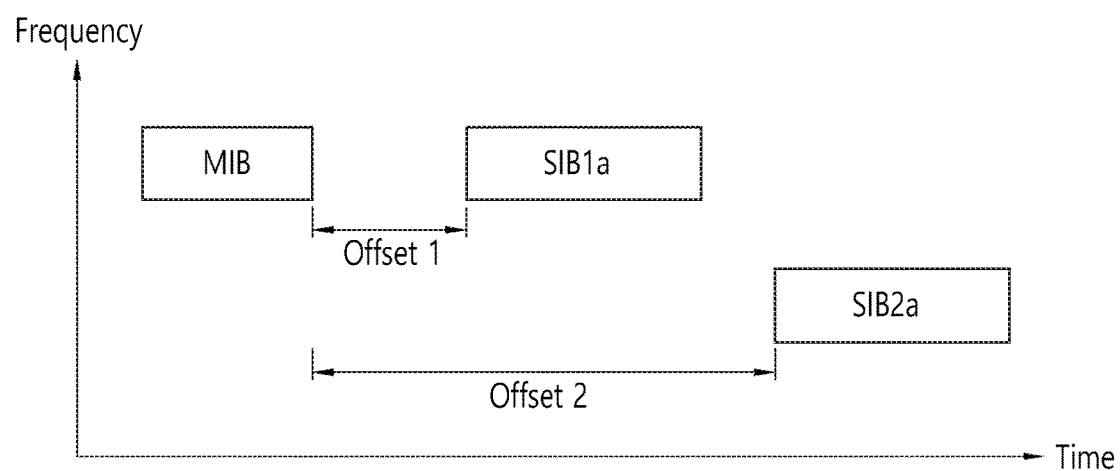
FIG. 13 illustrates an example of a method for scheduling and decoding an SIB when there is a plurality of SIBs according to an embodiment of the present invention.

FIG. 13 illustrates an example of a method for scheduling and decoding an SIB when there is a plurality of SIBs according to an embodiment of the present invention.

According to one embodiment, a different offset may be used for each SIB. For example, offset 1 may be used for new SIB1a, and offset 2 may be used for new SIB2a. SIB1a may be scheduled in a resource region spaced by offset 1 away from the start or end of an MIB repetition period. Alternatively, SIB1a may be scheduled in a resource region spaced by offset 1 away from a resource region for each repeated MIB. SIB2a may be scheduled in a resource region spaced by offset 2 away from the start or end of the MIB repetition period. Alternatively, SIB1a may be scheduled in a resource region spaced by offset 2 away from the resource region for each repeated MIB. A UE may receive/decode SIB1a or SIB2a in the resource region spaced by offset 1 or offset 2 away from the start or end of the MIB repetition period or the resource region for each repeated MIB.

According to another embodiment, SIBs other than a first SIB may be scheduled by the first SIB. To this end, the first SIB may include information on frequency regions and/or time regions for the other SIBs. The UE may decode the other SIBs using (modulation/coding) information used to decode the first SIB.

Figure 14:
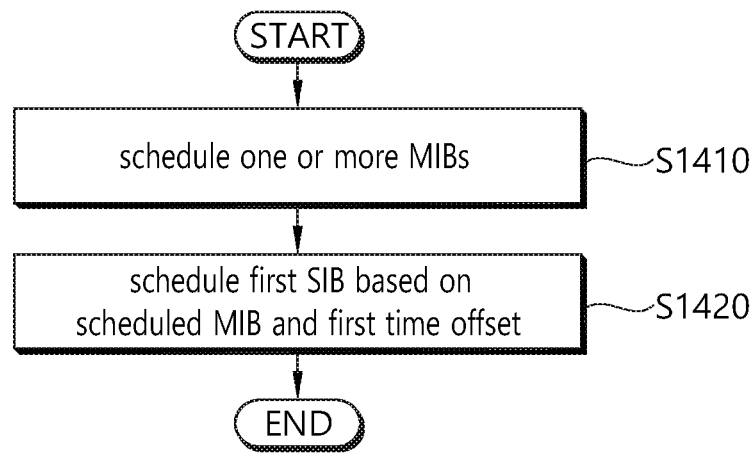
FIG. 14 illustrates an example of a method for scheduling an SIB according to an embodiment of the present invention.

FIG. 14 illustrates an example of a method for scheduling an SIB according to an embodiment of the present invention.

Referring to FIG. 14, a network may schedule one more MIBs (S1410). The MIB may be scheduled once or the MIB having the same content may be scheduled a plurality of times. The network may schedule a first SIB based on the scheduled MIB and a first time offset (S1420). The scheduled MIB may be the last scheduled MIB among the one or more MIBs. The scheduled MIB may be each received MIB. The first SIB is a system information block newly defined for a low-complexity UE, and the first time offset may be predefined or may be indicated by the scheduled MIB.

The first SIB may be scheduled by various methods. First, a PDCCH for the first SIB may be scheduled in a resource region spaced by the first offset away from the start or end time of the scheduled MIB, and the first SIB may be scheduled in a resource region indicated by the PDCCH for the first SIB. That is, the first SIB may be scheduled by the PDCCH for the first SIB. Alternatively, the first SIB may be scheduled in a resource region spaced by the first time offset away from the start or end time of the scheduled MIB.

An SIB other than the first SIB may also be defined for the low-complexity UE. In the present specification, this SIB is defined as a second SIB. The second SIB refers to an SIB newly defined for the low-complexity UE, which is distinguished from the first SIB, and may include one or more SIBs. The second SIB may be scheduled by various methods. First, when the first SIB includes information on a frequency region and a time region for the second SIB, the second SIB may be scheduled based on the scheduled first SIB. Alternatively, the second SIB may be scheduled in a resource region spaced by a second time offset away from the start or end time of the scheduled MIB. The second time offset may be predefined or may be indicated by the scheduled MIB. Alternatively, a PDCCH for the second SIB may be scheduled in a resource region spaced by the second time offset from the start or end time of the scheduled MIB, and the second SIB may be scheduled in a resource region indicated by the PDCCH for the second SIB. That is, the second SIB may be scheduled by the PDCCH for the second SIB.

Figure 15:
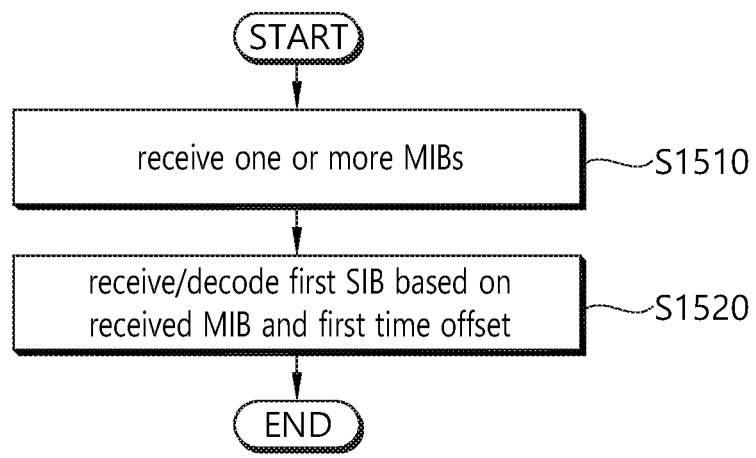
FIG. 15 illustrates an example of a method for receiving/decoding an SIB according to an embodiment of the present invention.

FIG. 15 illustrates an example of a method for receiving/decoding an SIB according to an embodiment of the present invention.

Referring to FIG. 15, a UE may receive one more MIBs (S1510). The MIB may be received once or a plurality of times. The UE may receive/decode a first SIB based on the received MIB and a first time offset (S1520). The received MIB may be the last received MIB among the one or more MIBs. The received MIB may be each received MIB. The first SIB is a system information block newly defined for a low-complexity UE, and the first time offset may be predefined or may be indicated by the received MIB.

The first SIB may be received/decoded by various methods. First, a PDCCH for the first SIB may be received/decoded in a resource region spaced by the first offset away from the start or end time of the received MIB, and the first SIB may be received/decoded in a resource region indicated by the PDCCH for the first SIB. That is, the first SIB may be received/decoded by the UE in the resource region indicated by the PDCCH for the first SIB.

Alternatively, the first SIB may be received/decoded in a resource region spaced by the first time offset away from the start or end time of the received MIB.

Further, a second SIB may be received/decoded by various methods. First, when the first SIB includes information on a frequency region and a time region for the second SIB, the second SIB may be received/decoded based on the received/decoded first SIB. In this case, the UE may receive/decode the second SIB using modulation/coding information used to decode the first SIB. Alternatively, the second SIB may be received/decoded in a resource region spaced by a second time offset away from the start or end time of the received MIB. The second time offset may be predefined or may be indicated by the received MIB. Alternatively, a PDCCH for the second SIB may be received/decoded in a resource region spaced by the second time offset from the start or end time of the received MIB, and the second SIB may be received/decoded in a resource region indicated by the PDCCH for the second SIB. That is, the second SIB may be decoded by the PDCCH for the second SIB.

Figure 16:
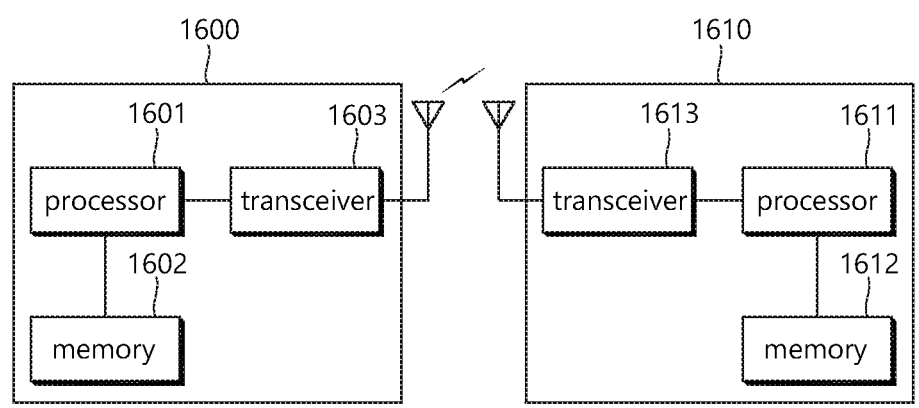
FIG. 16 is a block diagram illustrating a wireless communication system according to the embodiment of the present invention.

FIG. 16 is a block diagram illustrating a wireless communication system according to the embodiment of the present invention.

A BS 1600 includes a processor 1601, a memory 1602 and a transceiver 1603. The memory 1602 is connected to the processor 1601, and stores various information for driving the processor 1601. The transceiver 1603 is connected to the processor 1601, and transmits and/or receives radio signals. The processor 1601 implements proposed functions, processes and/or methods. In the above embodiment, an operation of the base station may be implemented by the processor 1601.

A UE 1610 includes a processor 1611, a memory 1612 and a transceiver 1613. The memory 1612 is connected to the processor 1611, and stores various information for driving the processor 1611. The transceiver 1613 is connected to the processor 1611, and transmits and/or receives radio signals. The processor 1611 implements proposed functions, processes and/or methods. In the above embodiment, an operation of the base station may be implemented by the processor 1611.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for receiving, by a user equipment (UE), a system information block (SIB) in a wireless communication system, the method comprising:
receiving a master information block (MIB);
receiving a physical downlink control channel (PDCCH) for a first SIB, with a first time offset from the received MIB,
wherein the PDCCH for the first SIB carries information on a frequency region and a time region of the first SIB; and
receiving the first SIB based on the information on the frequency region and the time region of the first SIB carried in the PDCCH for the first SIB,
wherein the first SIB is an SIB for a low-complexity UE, and
wherein a frequency region of the PDCCH for the first SIB is same as a frequency region of the received MIB.

2. The method of claim 1, wherein the first time offset is predefined or is indicated by the received MIB.

3. The method of claim 1, wherein the received MIB is a last received MIB among a plurality of MIB's.

4. The method of claim 1, wherein the low-complexity UE is one of a machine-type communication (MTC) UE, a low-cost UE, a UE Category 0 UE, a narrow band-Internet of Things (IoT) UE, or a coverage-enhancement UE.

5. The method of claim 1, wherein the PDCCH for the first SIB is received in a resource region spaced by the first time offset from a start time of the received MIB.

6. The method of claim 1, wherein the PDCCH for the first SIB is received in a resource region spaced by the first time offset from an end time of the received MIB.

7. The method of claim 6, wherein the PDCCH for the first SIB further includes modulating and coding information on the first SIB.

8. The method of claim 1, wherein the first SIB is received using information obtained by decoding the PDCCH for the first SIB in a resource region spaced by the first time offset from a start or end time of the received MIB.

9. The method of claim 1, further comprising:
receiving a second SIB based on the received first SIB including information on a frequency region and a time region of the second SIB,
wherein the second SIB is an SIB for the low-complexity UE.

10. The method of claim 1, further comprising:
receiving a second SIB based on the received MIB and a second time offset, wherein the second SIB is an SIB for the low-complexity UE.

11. The method of claim 10, wherein the second SIB is received in a resource region spaced by the second time offset from a start or end time of the received MIB.

12. The method of claim 10, further comprising:
receiving a PDCCH for the second SIB, with the second time offset from the received MIB,
wherein the PDCCH for the second SIB carries information on a frequency region and a time region of the second SIB, and
wherein the second SIB is received based on the information on the frequency region and the time region of the second SIB carried in the PDCCH for the second SIB.

13. A method for scheduling, by a network, a system information block (SIB) in a wireless communication system, the method comprising:
scheduling a master information block (MIB);
scheduling a physical downlink control channel (PDCCH) for a first SIB, with a first time offset from the scheduled MIB,
wherein the PDCCH for the first SIB carries information on a frequency region and a time region of the first SIB; and scheduling the first SIB based on the information on the frequency region and the time region of the first SIB carried in the PDCCH for the first SIB, wherein the first SIB is an SIB for a low-complexity user equipment (UE), and wherein a frequency region of the PDCCH for the first SIB is same as a frequency region of the scheduled MIB.

14. A device for receiving a system information block (SIB) in a wireless communication system, the device comprising:

a memory;

a transceiver; and a processor, coupled to the memory and the transceiver, that:

controls the transceiver to receive a master information block (MIB), controls the transceiver to receive a physical downlink control channel (PDCCH) for a first SIB, with a first time offset from the received MIB, wherein the PDCCH for the first SIB carries information on a frequency region and a time region of the first SIB, controls the transceiver to receive the first SIB, based on the information on the frequency region and the time region of the first SIB carried in the PDCCH for the first SIB, wherein the first SIB is an SIB for a low-complexity user equipment (UE), and wherein a frequency region of the PDCCH for the first SIB is same as a frequency region of the received MIB.

* * * * *